UNITED STATES PATENT OFFICE.

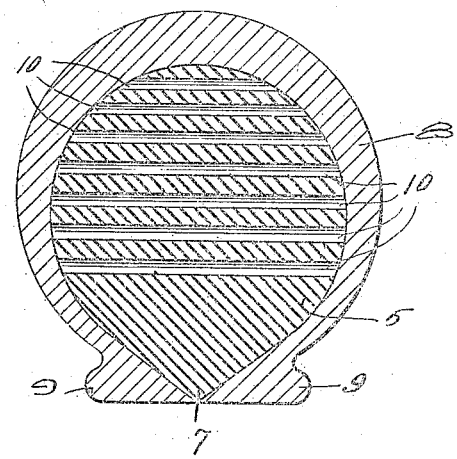
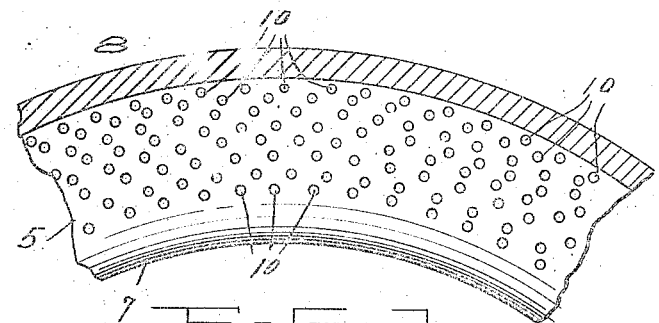

SILAS WINSCOTT, OF STURGEON, MISSOURI.

HONEYCOMB CUSHION-TIRE.

1,253,552.

Specification of Letters Patent. Patented Jan. 15, 1918.

Application filed August 6, 1915. Serial No. 44,050.

*To all whom it may concern:*

Be it known that I, SILAS WINSCOTT, a citizen of the United States, residing at Sturgeon, in the county of Boone and State of Missouri, have invented certain new and useful Improvements in Honeycomb Cushion-Tires; and I do hereby declare the following to be a full, clear, and exact description of the invention, such as will enable others skilled in the art to which it appertains to make and use the same.

This invention has for its object to provide an efficient and inexpensive tire of the cushion type specially designed for use upon the wheels of motor vehicles.

Another object is the provision of a cushion tire including a core formed of rubber or similar resilient material suitably shaped so as to fit within the casing of the ordinary pneumatic tire and having a plurality of apertures therethrough so arranged as to increase the resiliency and minimize the cost of manufacture thereof.

With these and other objects in view, the invention consists in the novel construction, arrangement and formation of parts as will be hereinafter specifically described, claimed and illustrated in the accompanying drawing, in which:

Figure 1 represents a transverse sectional view through a tire constructed in accordance with the invention, and, Fig. 2 represents a fragmental side elevation of the inner core, showing the outer casing in section.

Referring to the drawing in detail, wherein similar reference numerals designate corresponding parts throughout the several views, the numeral 5 indicates the inner core of the tire which is preferably formed of rubber and of adequate shape and size to snugly fit within a pneumatic tire casing 8. The inner portion of the core is formed with a circumferential V-shaped rib 7 suitably shaped to snugly fit between the beads 9 ordinarily provided upon tire casings designed to fit clencher rims.

The core 5 is formed with a plurality of apertures 10 extending transversely therethrough. The apertures 10 materially decrease the weight and consequently the amount of material required to construct the core, and further result in an increase in resilient qualities thereof. The inner tapered solid portion of the tire is approximately triangular and its relatively sharp apex is adapted to rest against the rim of the wheel between the sides of the outer tube or shoe and will relieve the latter of strain.

What I claim is:

The combination with an outer tube or shoe, of an annular core of elastic material completely filling and conforming to the configuration of the outer tube or shoe and consisting of a rounded outer portion provided with transverse openings and a solid inner tapered portion of approximately triangular shape in cross-section having a relatively sharp apex located between the sides of the outer tube or shoe and arranged to rest upon the rim of a wheel to relieve the outer tube or shoe of strain.

In testimony whereof I affix my signature in presence of two witnesses.

SILAS WINSCOTT.

Witnesses:
W. R. McCASLIN,
W. S. DONVANLEBIE.